W. Gale.
Straw Cutter.
No. 10,592. Patented Mar. 7, 1854.
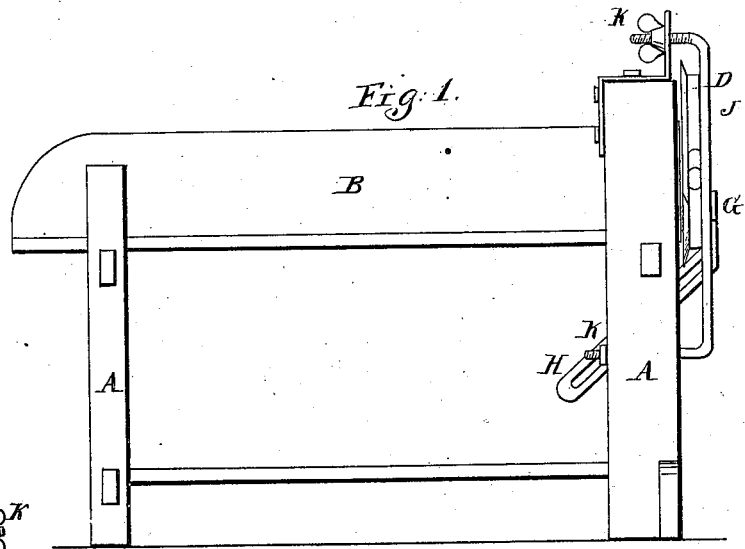
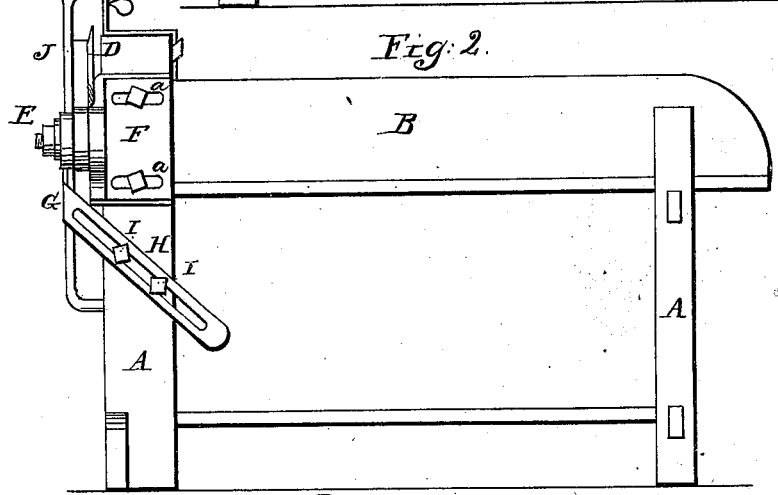
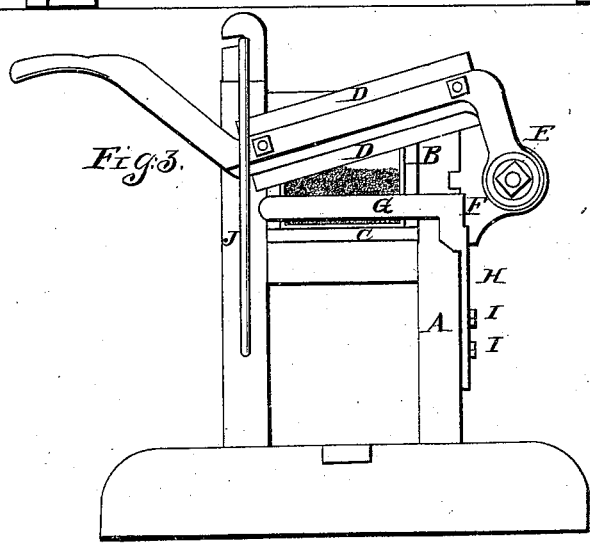

UNITED STATES PATENT OFFICE.

WARREN GALE, OF LOUISVILLE, KENTUCKY.

GAGE OF STRAW-CUTTERS.

Specification forming part of Letters Patent No. 10,592, dated March 7, 1854; Reissued June 26, 1866, No. 2,293.

*To all whom it may concern:*

Be it known that I, WARREN GALE, of Louisville, in the county of Jefferson and State of Kentucky, have invented certain new and useful Improvements in Straw-Cutters, of which the following is a full, clear, and exact description, reference being had to the accompanying drawing of the same, making part of this specification, in which—

Figure 1 represents an elevation of the front end; Fig. 2 an elevation of one side, and Fig. 3 an elevation of the other.

My invention and improvement consists in fitting the mouth of the cutting box with an adjustable gage, whose height above the fixed knife will vary with its distance therefrom, so that when the length of the cut is increased and the tendency of the straw to jam between the gage and the fixed knife is diminished, the depth of straw below the gage is increased so as to render the gaging more effectual and certain. I also secure the gage to the frame by one end, leaving the other free; and I make it of such material and strength, that it will readily yield to allow lumps, knots, or sticks to pass, that would lodge and choke the machine, if not fitted with a yielding gage.

My invention further consists in hinging the knife upon an adjustable pivot whereby it can be adjusted to compensate for the wear of the mouth of the cutting box which forms the stationary knife, without changing the angle with which it cuts against the latter, and without rendering the bearing of the joint less stable; and in connection with the adjustment of the pivot on which one end of the knife turns, the guide, which holds the knife up to its work, at the opposite end, is also made adjustable, so that its position may be regulated to correspond with that of the pivot.

In the accompanying drawing the frame (A), trough (B), stationary knife (C), and moving knife (D), are made and arranged in the usual manner, except that the pivot (E), on which the moving knife is hinged is attached to a plate (F), pierced with slots (a), through which set screws pass to secure it to the side of the frame. These slots admit of the pivot (E), and knife (D), being moved toward or from the mouth of the cutting box or the fixed knife, and secured in any position to which they may be adjusted. The guide (J) bar is formed with arms having a screw thread cut upon them, and which project backward through the leg of the frame to which it is secured by screw nuts (K).

The gage consists of a flexible bar (G), one end (H), of which is bent at a right angle to the rest and is much thicker and stronger than the opposite end. The bent end has a slot formed in it through which screws (I), pass to secure it to the leg of the frame. These slots admit of the gage being moved nearer to or farther from the fixed knife, so as to cut the straw into shorter or longer pieces as may be required. The oblique position of the slot causes the gage (G), to rise as it is moved from the knife and to descend as it approaches it, so that the height of the gage will be inversely as its distance from the knife.

When the gage is low, most of the cut straw will fall over it, and but little will fall between it and the fixed knife, and when the gage is more elevated, a less proportion of the cut straw will fall over it, and more will pass down between it and the knife; but if the gage should be raised too high, the cut straw would jam between it and the fixed knife, therefore the angle of ascent should be gradual and about as represented in the drawing.

What I claim as my invention, and desire to secure by Letters Patent, is—

The arrangement of the adjustable gage as herein described.

In testimony whereof I have hereunto subscribed my name.

WARREN GALE.

Witnesses:
MARCUS BALL,
H. E. HUNTINGTON.